United States Patent
Olewinski

[15] 3,656,889

[45] Apr. 18, 1972

[54] STABLE AQUEOUS SODIUM ALUMINATE SOLUTIONS

[72] Inventor: Edward W. Olewinski, Cicero, Ill.

[73] Assignee: Nalco Chemical Company, Chicago, Ill.

[22] Filed: Oct. 12, 1970

[21] Appl. No.: 80,119

[52] U.S. Cl. ................................................. 23/52
[51] Int. Cl. ........................................... C01f 7/02
[58] Field of Search ..................................... 23/52

[56] References Cited

UNITED STATES PATENTS 2,345,134  3/1944  Lindsay et al. ........................ 23/52
2,734,796  2/1956  Ashley et al. ........................ 23/52
2,926,069  2/1960  Perrin et al. ........................ 23/52

OTHER PUBLICATIONS

Prescott et al., " Metal Finishing" Oct. 1953, pp. 65– 67.

*Primary Examiner*—Herbert T. Carter
*Attorney*—John G. Premo, Charles W. Connors and Edward A. Ptacek

[57] ABSTRACT

The use of a synergistic blend of tartaric and gluconic acids or their salts has been found to effectively stabilize aqueous sodium aluminate solutions.

4 Claims, No Drawings

STABLE AQUEOUS SODIUM ALUMINATE SOLUTIONS

INTRODUCTION

Sodium aluminate has many commercial uses. For instance, it is employed on a large scale in the manufacture of paper, particularly when affixing starch onto paper fibers during the formation of a paper sheet. Although the dry sodium aluminate powder can be used at the paper mill site to make solutions of sodium aluminate, it is often preferable to make sodium aluminate solutions beforehand. The main disadvantage in the prior art is that the sodium aluminate solutions turn hazy upon standing due to the fact that the iron and other contaminants start to precipitate out of the solution. Insoluble forms of sodium aluminate and aluminum hydroxide also precipitate out of the solution because of their limited solubility and the presence of contaminants. Once these compounds do precipitate, the precipitate cannot be easily put back into the solution.

The prior art suggested the use of a slight molar excess of sodium hydroxide but this does not permit the use of the sodium aluminate solutions in delicate processes where the pH must be carefully controlled. There is also the possibility that if the sodium aluminate employed contains an unnecessarily large excess of sodium hydroxide, some of the aluminum sulfate will be precipitated by the sodium hydroxide as aluminum hydroxide.

OBJECTS

It is, therefore, an object of this invention to provide a stable sodium aluminate solution. It is a further object to provide a solution of sodium aluminate that maintains its clarity over long periods of time. Other objects will be apparent to those skilled in the art.

The present invention relates to a new and improved method of stabilizing sodium aluminate solutions which comprises adding a synergistic amount of a combination of tartaric and gluconic acids to a solution of sodium aluminate. The sodium aluminate solution does not become cloudy or precipitate aluminum hydroxide even upon long standing.

Prior art, such as U.S. Pat. No. 2,345,134 teaches using a stabilizing agent which may consist of any one or combination of a number of substances such as Rochelle salts, tartaric acid and its salts, saccharates, gluconic acid and its salts, gallic acid and its salts, and many other similar stabilizing substances. This invention demonstrates that a unique and specifically defined ratio and combination of tartaric and gluconic acids achieves the greater stability for the sodium aluminate solution than could be expected from the mere additive effect of two stabilizing agents.

The sodium aluminate solution can range from very, very dilute, essentially 0.1 percent to about 52 percent sodium aluminate. Preferably the sodium aluminate solution contains about 20–50 percent sodium aluminate. The stabilizing combination ranges from about 0.1 to 1.5 percent by weight based on the liquid. Preferably the stabilizing combination ranges from about 0.3 to about 0.5 percent by weight. Based on the sodium aluminate, the amount of stabilizing agent usually ranges from about 0.5 to 1.5 percent by weight.

The effective range of the stabilizing combination ratio of tartaric to gluconic acid ranges from about 70:30 to 90:10. Preferably the ratio is about 80:20 to 90:10.

The following table shows the stability of various blends of tartaric and gluconic acids.

TABLE I

| | Tartaric Acid | Gluconic Acid | Stability |
|---|---|---|---|
| Sample 1 | 100 | 0 | less than 24 hours |
| Sample 2 | 60 | 40 | 1 week |
| Sample 3 | 70 | 30 | 1–2 months |
| Sample 4 | 90 | 10 | 6 months |
| Sample 5 | 95 | 5 | 1–2 weeks (brown color) |
| Sample 6 | 0 | 100 | 2 weeks |

The solutions made up in Table I were made using a 42 percent sodium aluminate solution. The $Na_2O/Al_2O_3$ ratio generally ranged from 1:1 to 1:1.5. Preferably, the ratio is about 1:1.2. About 0.5 percent by weight of the stabilizing agent was used.

As can be readily seen, this invention covers the synergistic blend from 70:30 to 90:10. This range is effective for stabilizing the sodium aluminate solution from 1 to 6 months. Either stabilizing agent is ineffective alone as a stabilizer for a period greater than 2 weeks. The synergistic combination probably acts as a chelater of the iron in solution and as a crystal lattice modifier. The brown color is prevented from forming. The prevention of haze is also accomplished.

Naturally the salts of tartaric and gluconic acids could also be used in place of the acids.

SUMMARY

As can readily be seen it is of great advantage to the art to form a stabilized sodium aluminate solution. This has been accomplished by the use of a synergistic combination of stabilizing agents. This was not obvious in view of the prior art because there was no teaching that some unique formulation defined by a very narrow range would have a synergistic effect on the stabilization of sodium aluminate.

What I claim and desire to protect by Letters Patent is:

1. A process of stabilizing a sodium aluminate solution comprising adding to said solution from 0.1 to 1.5 percent by weight, based on the sodium aluminate solution, of a stabilizing combination, said stabilizing combination comprising a ratio of tartaric to gluconic acids of from 70:30 to 90:10.

2. The process of claim 1 in which the sodium aluminate solution contains from 20 to 50 percent sodium aluminate.

3. The process of claim 1 wherein the stabilizing combination comprises a ratio of tartaric to gluconic acid and its salts from 80:20 to 90:10.

4. The process of claim 1 in which from 0.3 to 0.5 percent by weight of a stabilizing combination is added to the sodium aluminate solution.

* * * * *